United States Patent [19]

Hoeppner et al.

[11] Patent Number: 4,659,038

[45] Date of Patent: Apr. 21, 1987

[54] AIRCRAFT WITH DEPLOYABLE WING PORTIONS

[75] Inventors: Hans-Jochen Hoeppner, Bremen; Ulrich Kraemer, Syke-Barrien; Michael Soelter, Bremen, all of Fed. Rep. of Germany

[73] Assignee: Messerschmitt-Boelkow-Blohm GmbH, Bremen, Fed. Rep. of Germany

[21] Appl. No.: 657,601

[22] Filed: Oct. 4, 1984

[30] Foreign Application Priority Data

Oct. 11, 1983 [DE] Fed. Rep. of Germany ....... 3336847

[51] Int. Cl.$^4$ ................................................ B64C 3/56
[52] U.S. Cl. ..................................... 244/49; 244/3.27
[58] Field of Search ....................... 244/49, 3.27, 3.28, 244/3.29, 138 A, 173; 16/66

[56] References Cited

U.S. PATENT DOCUMENTS

| 2,977,880 | 4/1961 | Kershner | 244/3.29 |
| 3,563,495 | 2/1971 | Korn | 244/3.29 |
| 4,307,875 | 12/1981 | Schnitzius | 16/66 |

*Primary Examiner*—Galen Barefoot
*Attorney, Agent, or Firm*—Ralf H. Siegemund

[57] ABSTRACT

The deployment of folded down wings in an aircraft following, for example, rocket assisted launching from the container is carried out through gas pressure springs with strong attenuation in the final phase, the springs being releasably coupled to the wings for being jettisoned upon completion of deployment.

1 Claim, 2 Drawing Figures

AIRCRAFT WITH DEPLOYABLE WING PORTIONS

BACKGROUND OF THE INVENTION

The present invention relates to an aircraft or airborne vehicle with foldable and/or pivotable wings under utilization of a resilient device for automatic deployment of the wing.

Aircraft or vehicles of the type to which the invention pertains are, for example, disclosed in U.S. Pat. No. 4,410,151. These vehicles are also known as drones and are launched by means of a booster rocket from a suitable silo or container. In order to store the craft in such a container, its wings must be amenable to be folded in some fashion because the vehicle as a whole is to be fairly tightly stored within the container being configured that indeed a rocket launch can be taken place from it.

For such vehicles, it is quite desirable to launch them in a completely automated fashion without requiring any preparation just immediately prior to the takeoff. This of course means that the wings can be deployed only after the vehicle has left the silo or container, but still during the phase of rocket assisted or booster flight. However, this booster phase is of a very short duration, and may last just barely a second so that the deployment of the wings may require particularly large adjustment forces. The deployment operation, however, is interfered with by the inertia of the accelerating vehicle, and by the immediately effective air resistance. Generally speaking then, one needs a very significant amount of energy for the fast deployment operation under utilization of the mass of the objects, and stoppage of the deployment movement when the deployment is completed is a rapid one indeed. Thus, deployment produces temporarily high kinetic energy of the deployment process itself which has to be absorbed in some fashion prior to completion of the deployment in order to avoid damage.

The aforementioned U.S. Pat. No. 4,410,151 suggests regular springs as a propelling mechanism for the deployment of wings or wing portions. In view of the limited space available, the lever action for obtaining, for example, a turning motion or pivot motion, or both, of the wing is very short. Thus, the forces necessary for wing deployment are significant and approach the permissible limits which the material can take up; since marginal conditions are undesirable, the duration of rocket boosting may have to be extended, which is undesirable for many reasons, or even impossible. Alternatively, the requisite forces under utilization of a short lever arm permits only to generate torques which are just sufficient to overcome interfering moments resulting, for example, from aerodynamic forces setting up interfering moments. Such deployment mechanism would still be unsatisfactory because they act too slow. Also, it may require an interlocking of the motion for the two wings such that they deploy in a strictly symmetrical and, therefore. balanced fashion. All this adds to the weight, and since these drones are small and light, any additional weight is highly undesirable. Also, fuel would have to be increased, which is to be maintained in the vicinity of the center of gravity.

DESCRIPTION OF THE INVENTION

It is an object of the present invention to provide a resilient or spring loading type device for the purpose of deployment of folded down wings in aircraft, which spring device must develop adequate force and operate at a sufficiently high speed to affect the deployment in the desired short period of time which, as was mentioned above, is usually below one second.

In accordance with the preferred embodiment of the present invention, it is suggested to deploy the wings in crafts of the type to which the invention pertains by means of gas pressure springs with strong attenuation in the final phase. The inventive feature offers the advantage that the resilient device operates with a relatively high spring constant, but serves simultaneously as attenuator in order to absorb the kinetic energy immediately prior to the completion of the deployment of the wing. In furtherance of the invention, it is suggested to arrange the gas pressure spring outside of the wing structure, and to provide connection to the wing in a releasable fashion. This means that the gas spring can be linked to the wing parts at a rather high effective lever arm, but can be removed (jettisoned) after completion of deployment. In connection therewith, it is of advantage to provide the connection of the gas pressure spring by means of pins or bolts, which are inserted in bores of the wing structure. Upon completion of deployment, the gas pressure springs can automatically be jettisoned under assistance of an auxiliary spring. All this is not only instrumental for obtaining a fast and faultless deployment, but the jettison of parts which have completed their function reduces the weight volume and the resistance.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawing, FIG. 1 illustrates an aircraft (fuselage) 10 mounted in a launching silo or container 11. The container 11 is of an elongated construction, the elongation of course extends perpendicular to the plane of the drawing. The vehicle 10 has wings 12 and 13, which in each instance are biparted in approximate middle or somewhat closer to the fuselage as far as the wing span is concerned. Accordingly, wing 12 has a portion 12', which is rigidly connected to the fuselage 10 of the vehicle, and a somewhat larger folded down wing portion 12" is hingedly connected to the end of the portion 12' of the wing. The wing 13 is analogously biparted into sections 13' and 13", as illustrated. Elements 25 refer to the rudder structure and 26 are guide elements analogous to elements shown in the above mentioned patent for guiding the vehicle out of the container.

Figure 1:
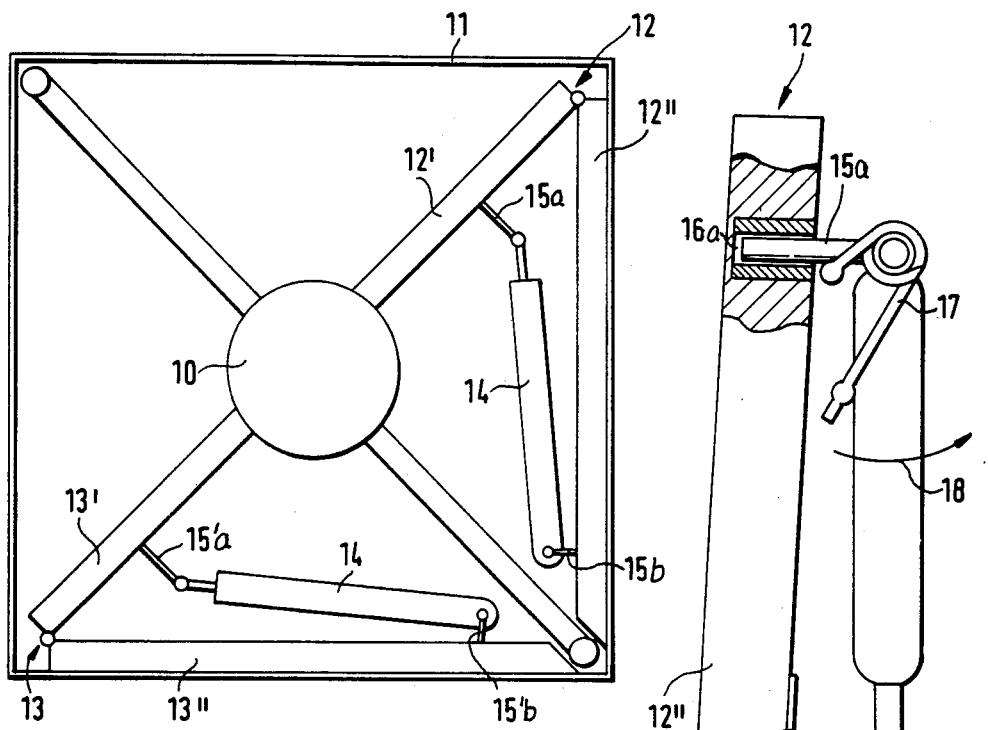
FIG. 1 is a front view of an aircraft with folded down wings stored in a container or launching silo.

In addition, one can see that wing parts 12' and 12" are interconnected by means of a gas pressure spring 14. This pressure spring is affixed to respective undersides of these wing portions. Reference numerals 15 and 15b refer to two connection rims for connecting the gas spring to the respective wing portions. There is analogously a gas spring 14' with connections 15', a, b for interconnecting the underside of wing portion 13' and 13".

Figure 2:
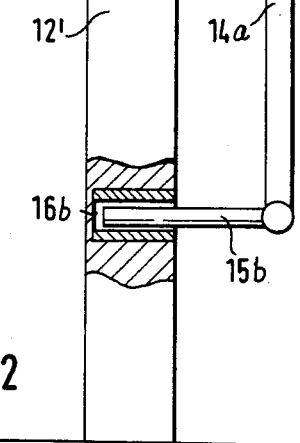
FIG. 2 illustrates a section through a portion of the vehicle with deployed wing.
Figure 2:
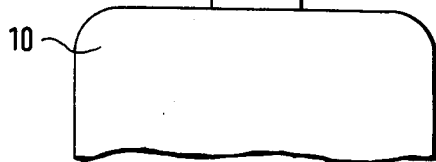

The connection of the gas spring and details thereof can be better understood with reference to FIG. 2. The figure shows the wing 12 in a deployed configuration as it is attained right after the takeoff or launch. The two sections are latched together in a manner known per se, i.e., the device 14 is not needed to hold the wing sections in the deployed state. The deployment was caused immediately upon departure of the vehicle from the container, which of course if effective by booster rocket action. As soon as the wings clear the container opening, the gas pressure spring expanded in that the plunger 14a was pushed out and caused wing portion 12" to be folded into alignment with the portion 12'. The connection which includes pins 15a, b are hinged to the end parts as illustrated of the gas pressure spring 14. That is to say, pin 15a is connected to one end of the pressurized casing, while the other pin, 15b, connects to the end of the plunger 14a. These pins 15a, b are simply stuck respectively into bores 16a, b in the wing portions 12' and 12". The resilient action of this spring makes sure that the pins remain in these bores as long as the wing is not completely deployed.

The jettison action is initiated by an additional leg spring or spring clip 17, which is arranged between the gas pressure spring 14 and the particular pin 15a, by means of which the spring casing end is held in the wing portion 12". The respective legs of spring 17 have extensions to lodge against spring casing and pin 15a, as illustrated. As soon as the gas pressure spring has spent its resilient action, the spring 17 causes the gas spring to be jetisoned. The jetison action is carried out in that the spring 17 forces (pivots) spring 14 in the direction of arrow 18, thereby pulling the pin 15b out of the bore 16b in part 12', and of course pin 15a will drop out of the bore 16a in wing part 12" shortly thereafter. The spring action of spring 17 makes sure that the spring 14 does not just drop out, but is jetisoned in a direction away from the fuselage 10, and therefore away from the propeller in the rear of the vehicle.

This gas pressure springs 14 have to provide a certain pivot moment in order to deploy the respective wing, so that the spring 14 has to be selected that any interference moments that may act upon the deployment, and particularly upon the pivoting of the wind portion 12", become insignificant. Moreover, it was found that by means of these gas pressure spring the deployment is sufficiently uniform, i.e., both wings are being deployed in parallel fashion as far as action is concerned, so that interlocking or intercoupling of the deployed sections of both wings is not necessary.

The gas pressure spring 14 is provided with an internal damping mechanism such that the plunger extension becomes severly retarded in the last phases of the deployment by means of internal cushioning, whereby the kinetic energy of the deployment action is absorbed inside the spring 14. Thus, this arrangement combines resilient action with final attenuation. Therefore, the attenuating action proper does not require additional parts having their own weight. Also, the jettison of the spring means provides a reduction in weight after the deployment and the corresponding volume decrease.

The spring 17 must be sufficiently strong. A sufficiently strong jettison spring 17 also ensures that the gas spring 14 will be jettisoned to a large degree independent from the earth's gravity because, particularly initially, the attitude and role disposition of the vehicle may not be that of normal flight. In fact then there is no inherent need for placing the gas spring 14 adjacent to those portions of the wings which will become the lower side of the deployed wing. In cases, it may be desirable to place the spring 14 on the upper side, and still a sufficiently strong spring 17 will make sure that the gas springs will be jettisoned after completion of wing deployment. Moreover, a suitable dimensioning of the pins 15a, etc., permits sufficient pivot moments to be developed between gas spring and jetison spring 17 in order to obtain self-locking holding force as long as this gas spring is not fully released. This then means that additional locking for the pins in dependance upon the wing's attitude is not necessary.

The invention is not limited to the embodiments described above, but all changes and modifications thereof not constituting departures from the spirit and scope fo the invention are not intended to be included.

I claim:

1. A vehicle having wing portions affixed to the fuselage and pivotable wing portions hinged to said affixed wing portions, each said portions having bores, a pair of gas pressure springs with final phase attenuation and having end pins stuck into said bores, respectively, for jettisoning the gas pressure spring following spring operated and attenuated deployment; and
 a jettison assist spring bearing against one of the pins and said gas pressure spring to ensure jettison of the gas pressure spring in the direction away from the fuselage.

* * * * *